United States Patent
Yun et al.

(10) Patent No.: US 8,350,604 B2
(45) Date of Patent: Jan. 8, 2013

(54) CLOCK RECEIVER IN SEMICONDUCTOR INTEGRATED CIRCUIT AND METHOD OF CONTROLLING THE SAME

(75) Inventors: Won Joo Yun, Gyeonggi-do (KR); Hyun Woo Lee, Gyeonggi-do (KR); Ki-Han Kim, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 0 days.

(21) Appl. No.: 12/645,630

(22) Filed: Dec. 23, 2009

(65) Prior Publication Data
US 2010/0308884 A1 Dec. 9, 2010

(30) Foreign Application Priority Data
Jun. 9, 2009 (KR) .................... 10-2009-0050796

(51) Int. Cl.
*H03L 7/00* (2006.01)
(52) U.S. Cl. ............................................. 327/143
(58) Field of Classification Search .................. 327/143
See application file for complete search history.

(56) References Cited

U.S. PATENT DOCUMENTS

| | | | |
|---|---|---|---|
| 5,694,066 A * | 12/1997 | Shyong | 327/113 |
| 6,327,190 B1 | 12/2001 | Kim et al. | |
| 6,686,787 B2 * | 2/2004 | Ling | 327/203 |
| 6,801,080 B1 | 10/2004 | Arcus | |
| 7,076,705 B2 | 7/2006 | Ohbayashi | |
| 7,212,050 B2 * | 5/2007 | Meltzer | 327/156 |
| 7,355,450 B1 | 4/2008 | Smith | |
| 2006/0023563 A1 | 2/2006 | Yoo | |
| 2006/0036992 A1 | 2/2006 | Hayles et al. | |
| 2006/0109948 A1 * | 5/2006 | Hashimoto | 377/120 |
| 2009/0046517 A1 | 2/2009 | Taruishi et al. | |

FOREIGN PATENT DOCUMENTS

| | | |
|---|---|---|
| JP | 11-127069 A | 5/1999 |
| JP | 2000-306385 A | 11/2000 |
| JP | 2001-177391 A | 6/2001 |
| JP | 2003-347860 A | 12/2003 |
| KR | 100672128 B1 | 1/2007 |
| KR | 1020070071107 A | 7/2007 |

* cited by examiner

*Primary Examiner* — Lincoln Donovan
*Assistant Examiner* — Daniel Rojas
(74) *Attorney, Agent, or Firm* — Ladas & Parry LLP

(57) ABSTRACT

A clock receiver in a semiconductor integrated circuit includes a first clock buffer configured to buffer an external clock to generate a low frequency buffered clock in response to a first operation signal; a second clock buffer configured to buffer the external clock to generate a high frequency buffered clock in response to a second operation signal; and an internal clock generating unit configured to receive the low frequency buffered clock and the high frequency buffered clock, to control states of the first operation signal and the second operation signal and to generate an internal clock.

14 Claims, 3 Drawing Sheets

CLOCK RECEIVER IN SEMICONDUCTOR INTEGRATED CIRCUIT AND METHOD OF CONTROLLING THE SAME

CROSS-REFERENCES TO RELATED APPLICATION

The present application claims priority under 35 U.S.C. 119(a) to Korean application number 10-2009-0050796, filed on Jun. 9, 2009, in the Korean Patent Office, which is incorporated by reference in its entirety as if set forth in full.

BACKGROUND

1. Technical Field

The embodiments described herein generally relate to a semiconductor integrated circuit, and more particularly, to a clock receiver in the semiconductor integrated circuit and a method of controlling the same.

2. Related Art

Typically, a semiconductor integrated circuit such as a Synchronous Dynamic Random Access Memory (SDRAM) has improved its operation speed by using a clock. For this improved operational speed, the semiconductor integrated circuit includes a clock buffer and buffers the clock inputted through a pad. In addition, the semiconductor integrated circuit uses the clock that is internally generated by compensating a phase difference with respect to the external clock, using a Delay Locked Loop (DLL) circuit or a Phase Locked Loop (PLL) circuit. As a result, the semiconductor integrated circuit inputs the external clock to generate the clock for internal use of the semiconductor integrated circuit. Accordingly, this semiconductor integrated circuit having an input from the external clock includes a clock receiver to receive and buffer the external clock. Typically the conventional clock receiver is generally configured with two differential amplifiers that are coupled with each other, and buffers the external clock to generate the clock which has a swing width suitable for inside of the semiconductor integrated circuit.

The semiconductor integrated circuit can be placed in various operation environments. The trend is toward having semiconductor integrated circuits to be configured to operate in environments where a high frequency operation is performed. Accordingly, the clock receiver is also manufactured to have a configuration suitable for the high frequency operation environment Therefore, this clock receiver for suitable for the high frequency operation environment is configured to increase a bias current applied to the internal differential amplifier of the semiconductor integrated circuit.

However, there are times when the semiconductor integrated circuit configured for the high frequency operation environment is not always placed in the high frequency operation environment wherein the semiconductor integrated circuit is placed in either a low frequency operation environment as well as the high frequency operation environment. As a result, when the semiconductor integrated circuit configured for the high frequency operation environment is placed in the low frequency operation environment and having the clock receiver configured suitable for the high frequency operation environment, this configuration causes a large amount of current consumption, thereby decreasing power efficiency of the semiconductor integrated circuit.

Therefore, the conventional clock receiver in the semiconductor integrated circuit lacks adaptability to the operation environment, thereby causing loss of power.

SUMMARY

In one embodiment of the present invention, a clock receiver in a semiconductor integrated circuit includes: a first clock buffer configured to buffer an external clock to generate a low frequency buffered clock in response to a first operation signal; a second clock buffer configured to buffer the external clock to generate a high frequency buffered clock in response to a second operation signal; and an internal clock generating unit configured to receive the low frequency buffered clock and the high frequency buffered clock, to control states of the first operation signal and the second operation signal and to generate an internal clock.

In another embodiment of the present invention, a method of controlling a clock receiver in a semiconductor integrated circuit includes: enabling a first operation signal and a second operation signal to activate a first clock buffer and a second clock buffer; detecting whether or not a low frequency buffered clock is generated from the first clock buffer; disabling either the first operation signal or the second operation signal; and outputting either the low frequency buffered clock or a high frequency buffered clock generated from the second clock buffer, as an internal clock.

BRIEF DESCRIPTION OF THE DRAWINGS

Features, aspects, and embodiments are described in conjunction with the attached drawings, in which.

DETAILED DESCRIPTION

Figure 1:
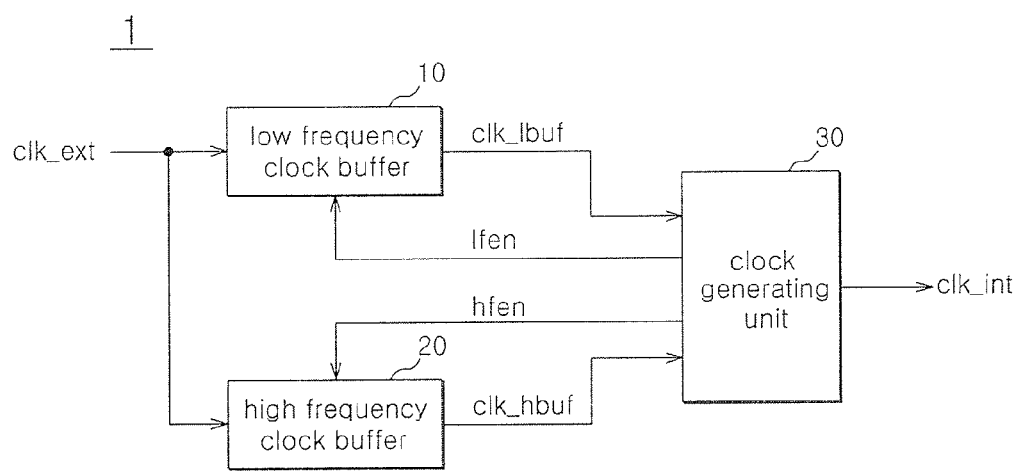
FIG. 1 is a block diagram showing a clock receiver that can be included in a semiconductor integrated circuit according to an embodiment of the present invention.

FIG. 1 is a block diagram showing a clock receiver 1 in a semiconductor integrated circuit according to an embodiment of the present invention.

As shown in FIG. 1, the clock receiver 1 includes a low frequency clock buffer 10, a high frequency clock buffer 20, and a clock generating unit 30.

The low frequency clock buffer 10 performs a buffering operation in response to a low frequency operation signal 'lfen' to generate a low frequency buffered clock 'clk_lbuf'. The high frequency clock buffer 20 performs a buffering operation in response to a high frequency operation signal 'hfen' to generate a high frequency buffered clock 'clk_hbuf'. Then, the clock generating unit 30 receives the low frequency buffered clock 'clk_lbuf' and the high frequency buffered clock 'clk_hbuf', and controls states of the low frequency operation signal 'lfen' and the high frequency operation signal 'hfen' to generate an internal clock 'clk_int'.

The clock generating unit 30 enables both the low frequency operation signal 'lfen' and the high frequency operation signal 'hfen' at the beginning of the operation of the clock receiver 1.

The low frequency clock buffer 10 is configured to operate when the external clock 'clk_ext' has a low frequency that is equal to or lower than a predetermined reference frequency. In an embodiment, when the external clock 'clk_ext' has a high frequency higher than the reference frequency, the low frequency clock buffer 10 cannot generate the low frequency buffered clock 'clk_lbuf'. As a result, the low frequency buffered clock 'clk_lbuf' cannot toggle in a form of clock, and has a voltage at a logic low level, thereby substantially being a dummy signal.

In an embodiment, when the low frequency buffered clock 'clk_lbuf' is disabled, the clock generating unit 30 detects this disable state and disables the low frequency operation signal 'lfen'. Then, the high frequency clock buffer 20 generates the high frequency buffered clock 'clk_hbuf' that toggles normally. Next, the clock generating unit 30 drives and outputs the high frequency buffered clock 'clk_hbuf', as the internal clock 'clk_int'.

Accordingly, when the semiconductor integrated circuit is placed in a high frequency operation environment and the external clock 'clk_ext' is implemented as the high frequency clock, the clock receiver 1 deactivates the low frequency clock buffer 10, and activates the high frequency clock buffer 20.

In contrast, when the external clock 'clk_ext' is the low frequency clock that is substantially equal to or lower than the reference frequency, the low frequency clock buffer 10 generates the low frequency buffered clock 'clk_lbuf' that toggles normally. Then, when the low frequency buffered clock 'clk_lbuf' is enabled, the clock generating unit 30 detects this enable state and disables the high frequency operation signal 'hfen'. Accordingly, the high frequency clock buffer 20 disables the high frequency buffered clock 'clk_hbuf', and then the clock generating unit 30 drives and outputs the low frequency buffered clock 'clk_lbuf', as the internal clock 'clk_int'.

In an embodiment, when the semiconductor integrated circuit is placed in a low frequency operation environment and the external clock 'clk_ext' is implemented as the low frequency clock, the clock receiver 1 activates the low frequency clock buffer 10, and deactivates the high frequency clock buffer 20. Accordingly, the high frequency clock buffer 20 has a larger amount of current consumption than the low frequency clock buffer 10. Therefore, the clock receiver 1 deactivates the high frequency clock buffer 20, and thereby improving power efficiency by eliminating the large amount of current in the high frequency clock buffer 20.

Figure 2:
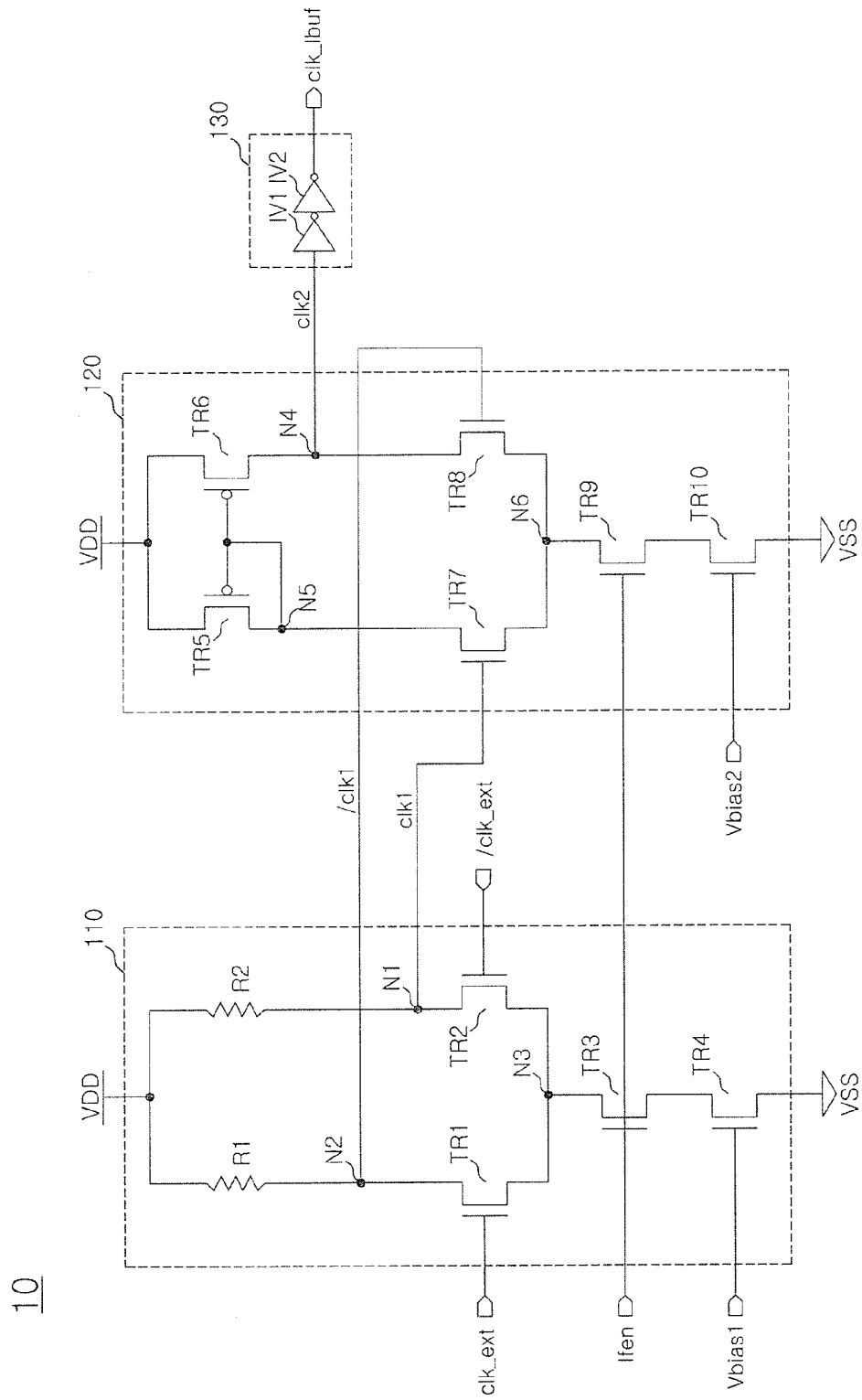
FIG. 2 is a diagram showing the low frequency clock buffer in the clock receiver illustrated in FIG. 1 of the present invention.

FIG. 2 is a diagram showing a configuration of the low frequency clock buffer 10 that is included in the clock receiver 1 illustrated in FIG. 1, wherein the external clock 'clk_ext' is implemented in a form of clock pair 'clk_ext' and '/clk_ext'.

As shown in FIG. 2, the low frequency clock buffer 10 includes a first buffering unit 110, a second buffering unit 120, and a first driving unit 130.

The first buffering unit 110 buffers the external clock pair 'clk_ext' and '/clk_ext' to output a first clock pair 'clk1' and '/clk1' in response to the low frequency operation signal 'lfen' and a first bias voltage Vbias1. The first buffering unit 110 includes first to third nodes N1 to N3, first and second resistors R1 and R2, and first to fourth transistors TR1 to TR4.

The first node N1 outputs the positive first clock 'clk1' of the first clock pair 'clk1' and '/clk1'. The second node N2 outputs the negative first clock '/clk1' of the first clock pair 'clk1' and '/clk1'. One terminal of the first resistor R1 is applied with an external power supply voltage VDD, and the other terminal of the first resistor R1 is coupled to the second node N2.

The first transistor TR1 has a gate to which the positive external clock 'clk_ext' is inputted, a drain coupled to the second node N2, and a source coupled to the third node N3. The second transistor TR2 has a gate to which the negative external clock '/clk_ext' is inputted, a drain coupled to the first node N1, and a source coupled to the third node N3. The third transistor TR3 has a gate to which the low frequency operation signal 'lfen' is inputted, and a drain coupled to the third node N3. The fourth transistor TR4 has a gate to which the first bias voltage Vbias1 is applied, a drain coupled to a source terminal of the third transistor TR3, and a source coupled to the ground.

The second buffering unit 120 buffers the first clock pair 'clk1' and '/clk1' to output a second clock 'clk2' in response to the low frequency operation signal 'lfen' and a second bias voltage Vbias2.

The second buffering unit 120 includes fourth to sixth nodes N4 to N6, and fifth to tenth transistors TR5 to TR10.

The fourth node N4 outputs the second clock 'clk2'. The fifth transistor TR5 has a gate and a drain both of which are coupled to the fifth node N5, and a source to which the external power supply voltage VDD is applied. The sixth transistor TR6 has a gate coupled to the fifth node N5, a drain coupled to the fourth node N4, and a source to which the external power supply voltage VDD is applied. The seventh transistor TR7 has a gate to which the positive first clock 'clk1' is inputted, a drain coupled to the fifth node N5, and a source coupled to the sixth node N6.

The eighth transistor TR8 has a gate to which the negative first clock '/clk1' is inputted, a drain coupled to the fourth node N4, and a source coupled to the sixth node N6. The ninth transistor TR9 has a gate to which the low frequency operation signal 'lfen' is inputted, and a drain coupled to the sixth node N6. The tenth transistor TR10 has a gate to which the second bias voltage Vbias2 is applied, a drain coupled to a source terminal of the ninth transistor TR9, and a source coupled to the ground.

The first driving unit 130 drives the second clock 'clk2' to generate the low frequency buffered clock 'clk_lbuf'. The first driving unit 130 includes inverters IV1 and IV2, coupled in series, which drive the second clock 'clk2' to output the low frequency buffered clock 'clk_lbuf'.

The low frequency clock buffer 10 can be activated and perform the buffering operation, only when the low frequency operation signal 'lfen' is enabled. The positive first clock 'clk1' has substantially the same phase as the positive external clock 'clk_ext', and the negative first clock '/clk1' has substantially the same phase as the negative external clock '/clk_ext'. In addition, the second clock 'clk2' has substantially the same phase as the positive first clock 'clk1'. Here, the first and second bias voltages Vbias1 and Vbias2 control swing widths of the first clock pair 'clk1' and '/clk1' and the second clock 'clk2' and the operation speeds of the first buffering unit 110 and the second buffering unit 120. The first and second bias voltages Vbias1 and Vbias2 have predetermined voltage levels so that the first buffering unit 110 and the second buffering unit 120 to buffer the low frequency clock.

The high frequency clock buffer 20 has a similar configuration to the low frequency clock buffer 10, except that the high frequency clock buffer 20 is controlled by the high frequency operation signal 'hfen' instead of the low frequency operation signal 'lfen' and is controlled by higher voltages than the first and second bias voltages Vbias1 and Vbias2. The high frequency clock buffer 20 uses higher bias voltages than the low frequency clock buffer 10, and therefore the amount of current consumed in the high frequency clock buffer 20 is larger than the current consumed in the low frequency clock buffer 10.

Figure 3:
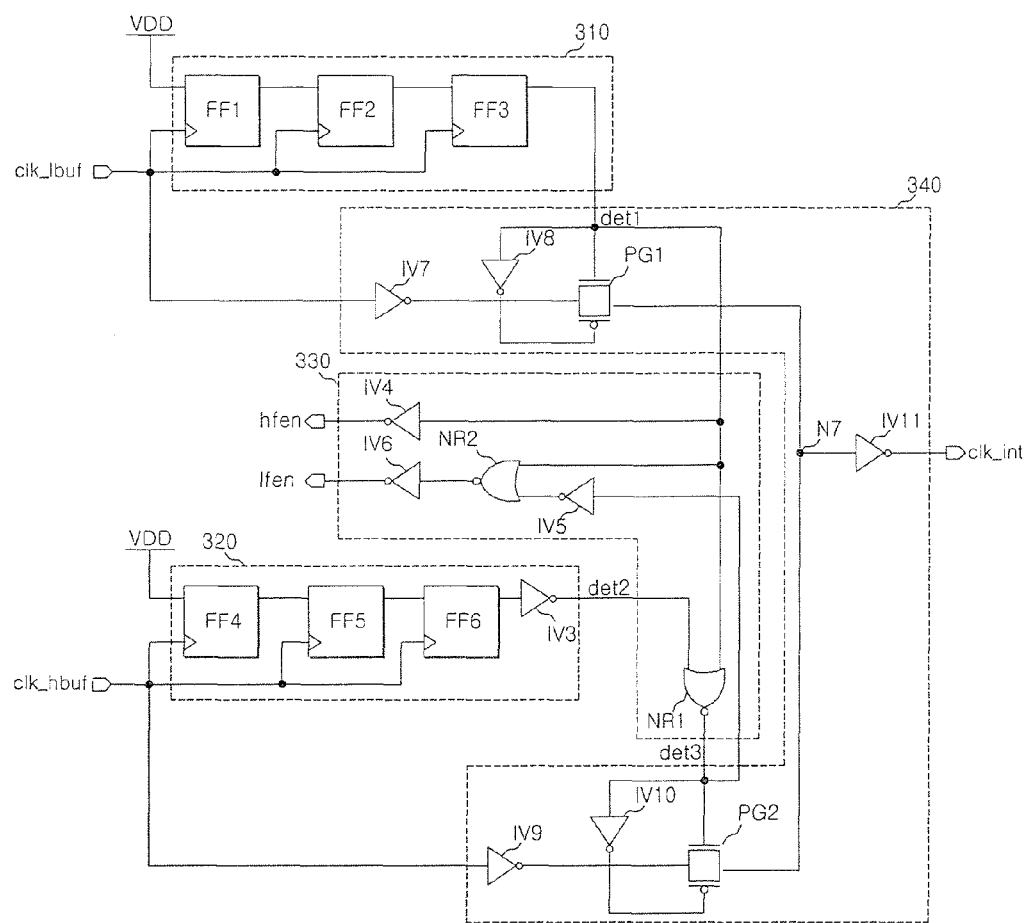
FIG. 3 is a diagram showing the clock generating unit in the clock receiver illustrated in FIG. 1 of the present invention.

FIG. 3 is a diagram showing a configuration of the clock generating unit included in the clock receiver 1 illustrated in FIG. 1 of the present invention.

As shown in FIG. 3, the clock generating unit 30 includes a first detection unit 310, a second detection unit 320, a buffer control unit 330, and a second driving unit 340.

The first detection unit 310 detects whether the low frequency buffered clock 'clk_lbuf' is enabled or not, and generates a first detection signal 'det1'. The first detection unit 310 includes first to third flip-flops FF1 to FF3 that transfer an output signal of the preceding flip-flop to the succeeding flip-flop controlled by the low frequency buffered clock 'clk_lbuf'. The first flip-flop FF1 is configured to receive the external power supply voltage VDD as an input signal, and the third flip-flop FF3 is configured to output the first detection signal 'det1'.

The second detection unit 320 detects whether the high frequency buffered clock 'clk_hbuf' is enabled or not, and generates a second detection signal 'det2'. The second detection unit 320 includes fourth to sixth flip-flops FF4 to FF6, and has a similar configuration to the first detection unit 310. The difference is that the fourth to sixth flip-flops FF4 to FF6 are controlled the high frequency buffered clock 'clk_hbuf' and the second detection unit 320, which further includes a third inverter IV3 coupled to an output terminal of the sixth flip-flop FF6 to output the second detection signal 'det2'.

The buffer control unit 330 generates a third detection signal 'det3' in response to the first detection signal 'det1' and the second detection signal 'det2', and also generates the high frequency operation signal 'hfen' and the low frequency operation signal 'lfen' in response to the first detection signal 'det1' and the third detection signal 'det3'. The buffer control unit 330 includes first and second NOR gates NR1 and NR2, and fourth to sixth inverters IV4 to IV6.

The fourth inverter IV4 receives the first detection signal 'det1', and outputs the high frequency operation signal 'hfen'. The first NOR gate NR1 receives the first detection signal 'det1' and the second detection signal 'det2', and outputs the third detection signal 'det3'. The fifth inverter IV5 receives the third detection signal 'det3'. The second NOR gate NR2 receives the first detection signal 'det1' and an output signal of the fifth inverter IV5. The sixth inverter IV6 receives an output signal of the second NOR gate NR2, and outputs the low frequency operation signal 'lfen'.

The second driving unit 340 drives either the low frequency buffered clock 'clk_lbuf' or the high frequency buffered clock 'clk_hbuf' to generate the internal clock 'clk_int', in response to the first detection signal 'det1' and the third detection signal 'det3'. The second driving unit 340 includes first and second pass gates PG1 and PG2, and seventh to eleventh inverters IV7 to IV11.

The seventh inverter IV7 receives the low frequency buffered clock 'clk_lbuf'. And, the eighth inverter IV8 receives the first detection signal 'det1'. The first pass gate PG1 transfers an output signal of the seventh inverter IV7 to a seventh node N7 under the control of the first detection signal 'det1' and an output signal of the eighth inverter IV8. The ninth inverter IV9 receives the high frequency buffered clock 'clk_hbuf'. The tenth inverter IV10 receives the third detection signal 'det3'. The second pass gate PG2 transfers an output signal of the ninth inverter IV9 to the seventh node N7 under the control of the third detection signal 'det3' and an output signal of the tenth inverter IV10. The eleventh inverter IV11 receives a voltage applied to the seventh node N7, and then outputs the internal clock 'clk_int'.

Initially, the first detection signal 'det1' has a voltage at a logic low level, and the second detection signal 'det2' has a voltage at a logic high level. Subsequently, the third detection signal 'det3' has a voltage at a logic low level. Therefore, in the buffer control unit 330, both the high frequency operation signal 'hfen' outputted from the fourth inverter IV4 and the low frequency operation signal 'lfen' are enable after receiving an output from the sixth inverter IV6.

Next, the low frequency buffered clock 'clk_lbuf' toggles normally, the first detection unit 310 outputs the first detection signal 'det1' at a logic high level after three rising edges of the low frequency buffered clock 'clk_lbuf'. Accordingly, the high frequency operation signal 'hfen' is disabled, and the low frequency operation signal 'lfen' substantially maintains the enable state. Subsequently, based on the voltage levels of the first detection signal 'det1' and the third detection signal 'det3', the first pass gate PG1 of the second driving unit 340 is turned on, and the second pass gate PG2 thereof is turned off. Therefore, the second driving unit 340 non-inversely drives the low frequency buffered clock 'clk_lbuf', to generate the internal clock 'clk_int'.

On the other hand, where the low frequency buffered clock 'clk_lbuf' does not toggle normally, the first detection signal 'det1' has a voltage at a logic low level and when the high frequency buffered clock 'clk_hbuf' toggles normally, the second detection unit 320 outputs the second detection signal 'det2' at a logic low level after three rising edges of the high frequency buffered clock 'clk_hbuf'. As a result, the third detection signal 'det3' substantially becomes a logic high level. Then, the high frequency operation signal 'hfen' is enabled, and the low frequency operation signal 'lfen' is disabled. Then, based on the voltage levels of the first detection signal 'det1' and the third detection signal 'det3', the first pass gate PG1 of the second driving unit 340 is turned off, and the second pass gate PG2 thereof is turned on. Therefore, the second driving unit 340 non-inversely drives the high frequency buffered clock 'clk_hbuf' to generate the internal clock 'clk_int'.

Therefore, in the initial operation, the clock receiver 1 in the semiconductor integrated circuit according to an embodiment of the present invention enables the low frequency operation signal 'lfen' and the high frequency operation signal 'hfen', and then activates the low frequency clock buffer 10 and the high frequency clock buffer 20. Afterwards, the clock receiver 1 according to the embodiment of the present invention detects whether or not the low frequency buffered clock 'clk_lbuf' is generated from the low frequency clock buffer 10.

In an embodiment, when the clock receiver 1 detects that the low frequency buffered clock 'clk_lbuf' toggles normally, the clock receiver disables the high frequency operation signal 'hfen' to reduce the amount of current consumed in the high frequency clock buffer 20. Then, the clock receiver 1 enables the low frequency operation signal 'lfen' to support the normal operation of the low frequency clock buffer 10. Moreover, the clock receiver 1 drives the low frequency buffered clock 'clk_lbuf to generate the internal clock 'clk_int'.

In an embodiment, when the clock receiver 1 detects that the low frequency buffered clock 'clk_lbuf' is disabled, the clock receiver disables the low frequency operation signal 'lfen' and enables the high frequency operation signal 'hfen' to support the normal operation of the high frequency clock buffer 20. Moreover, the clock receiver 1 drives the high frequency buffered clock 'clk_hbuf' to generate the internal clock 'clk_int'.

As described above, the clock receiver in the semiconductor integrated circuit according to an embodiment of the present invention selectively activates either the high frequency clock buffer or the low frequency clock buffer based on whether or not the low frequency buffered clock is generated. Here, when the clock receiver detects that the low frequency buffered clock toggles normally, the clock receiver deactivates the high frequency clock buffer. As a result, the clock receiver reduces power loss by deactivating the high frequency clock buffer, which uses a large amount of current consumption during the low frequency operation. Additionally, the clock receiver improves adaptability to the external operation environment because the clock receiver is used regardless of whether the semiconductor integrated circuit is in the low frequency operation environment or in the high frequency operation environment.

While certain embodiments have been described above, it will be understood to those skilled in the art that the embodiments described are by way of example only. Accordingly, the device and method described herein should not be limited based on the described embodiments. Rather, the apparatus described herein should only be limited in light of the claims that follow when taken in conjunction with the above description and accompanying drawings.

What is claimed is:

1. A clock receiver in a semiconductor integrated circuit comprising:
    a first clock buffer configured to buffer an input clock to generate a first buffered clock in response to a first operation signal, wherein the first buffered clock has a substantially same frequency with the input clock;
    a second clock buffer configured to buffer the input clock to generate a second buffered clock in response to a second operation signal, wherein the second buffered clock has a substantially same frequency with the input clock; and
    an internal clock generating unit configured to receive the first buffered clock and the second buffered clock, to disable one of the first operation signal and the second operation signal and to generate an internal clock,
    wherein a frequency of the input clock has a substantially same with a frequency of the internal clock.

2. The clock receiver of claim 1, wherein the first clock buffer is configured to be activated in a first frequency region and to be deactivated in a second frequency region to output a signal having a logic low level.

3. The clock receiver of claim 2, wherein the first clock buffer includes:
    a first buffering unit configured to buffer the input clock to output a first clock pair in response to the first operation signal and a first bias voltage;
    a second buffering unit configured to buffer the first clock pair to output a second clock in response to the first operation signal and a second bias voltage; and
    a first driving unit configured to drive the second clock to generate the first buffered clock.

4. The clock receiver of claim 3, wherein the second clock buffer includes:
    a third buffering unit configured to buffer the input clock to output a third clock pair in response to the second operation signal and a third bias voltage;
    a fourth buffering unit configured to buffer the third clock pair to output a fourth clock in response to the second operation signal and a fourth bias voltage; and
    a second driving unit configured to drive the fourth clock to generate the high frequency buffered clock; and
    wherein the level of the third bias voltage is configured to be higher than the level of the first bias voltage, and the level of the fourth bias voltage is configured to be higher than the level of the second bias voltage.

5. The clock receiver of claim 1, wherein the clock generating unit is configured to enable both the first operation signal and the second operation signal at the beginning of the operation.

6. The clock receiver of claim 5, wherein when the first buffered clock is disabled, the clock generating unit is configured to disable the first operation signal, to substantially maintain an enable state of the second operation signal and to drive the second buffered clock to generate the internal clock.

7. The clock receiver of claim 6, wherein when the first buffered clock is enabled, the clock generating unit is configured to disable the second operation signal, to substantially maintain an enable state of the first operation signal and to drive the first buffered clock to generate the internal clock.

8. The clock receiver of claim 7, wherein the clock generating unit includes:
    a first detection unit configured to detect whether or not the first buffered clock is enabled to generate a first detection signal;
    a second detection unit configured to detect whether or not the second buffered clock is enabled to generate a second detection signal;
    a buffer control unit configured to generate a third detection signal in response to the first detection signal and the second detection signal, and to generate the first operation signal and the second operation signal in response to the first detection signal and the third detection signal; and
    a driving unit configured to drive either the first buffered clock or the second buffered clock to generate the internal clock, in response to the first detection signal and the third detection signal.

9. A method of controlling a clock receiver in a semiconductor integrated circuit comprising:
    enabling a first operation signal and a second operation signal to activate a first clock buffer and a second clock buffer;
    detecting whether or not a first buffered clock is generated from the first clock buffer;
    disabling either the first operation signal or the second operation signal; and
    outputting either the first buffered clock or a second buffered clock generated from the second clock buffer, as an internal clock,
    wherein the first buffered clock or the second buffered clock has a same frequency with the input clock.

10. The method of claim 9, wherein detecting whether or not the first buffered clock is generated and disabling either the first operation signal or the second operation signal includes disabling the second operation signal and substantially maintaining an enable state of the first operation signal, when the first buffered clock toggles is detected.

11. The method of claim 10, wherein outputting the internal clock includes driving the first buffered clock to generate the internal clock.

12. The method of claim 9, wherein detecting whether or not the first buffered clock is generated and disabling either the first operation signal or the second operation signal includes disabling the first operation signal and substantially maintaining an enable state of the second operation signal, when the first buffered clock is disabled is detected.

13. The method of claim 12, wherein outputting the internal clock includes driving the second buffered clock to generate the internal clock.

14. The method of claim 9, wherein the second clock buffer is provided with a bias voltage higher than a bias voltage provided to the first clock buffer.

* * * * *